United States Patent Office 3,613,219
Patented Oct. 19, 1971

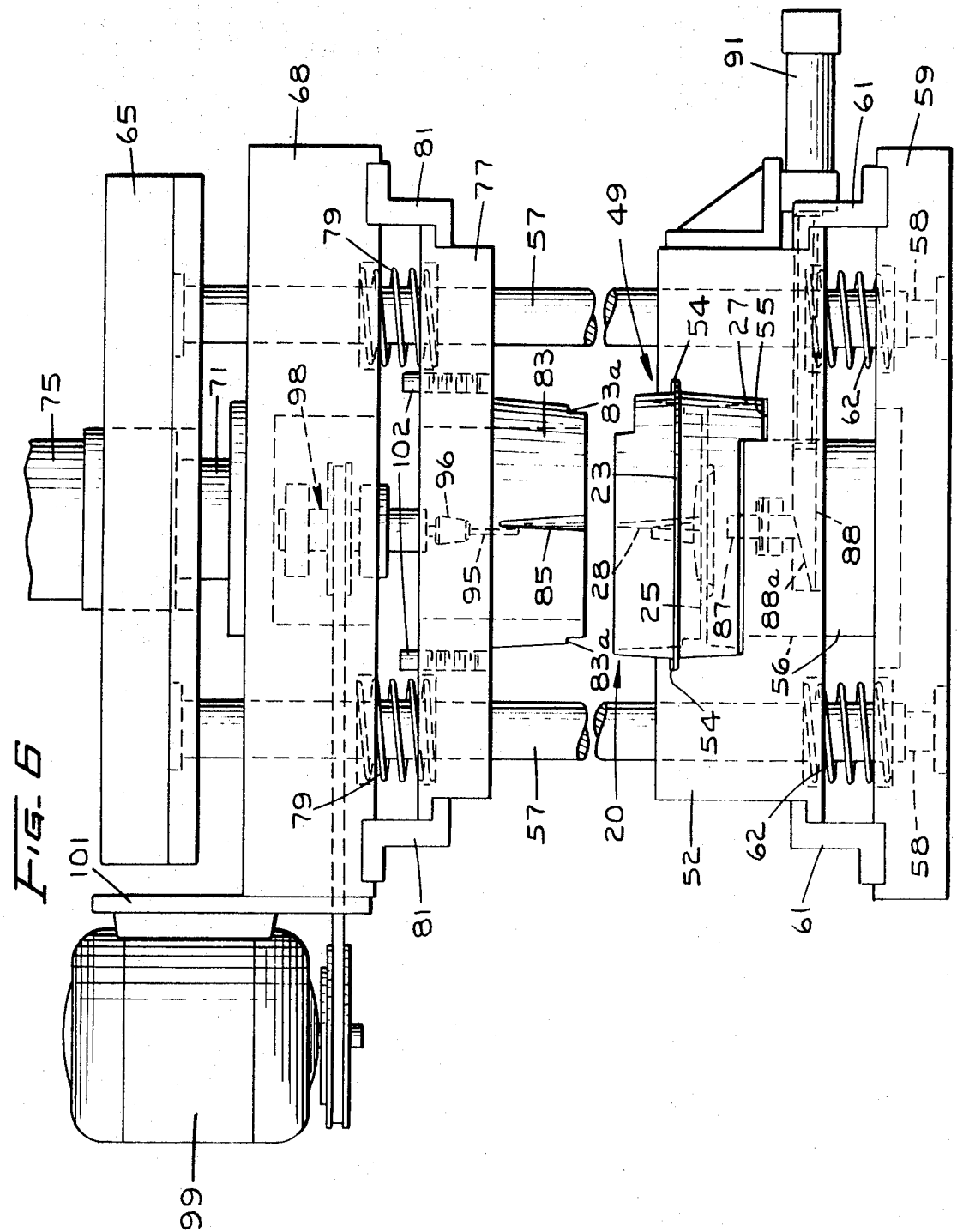

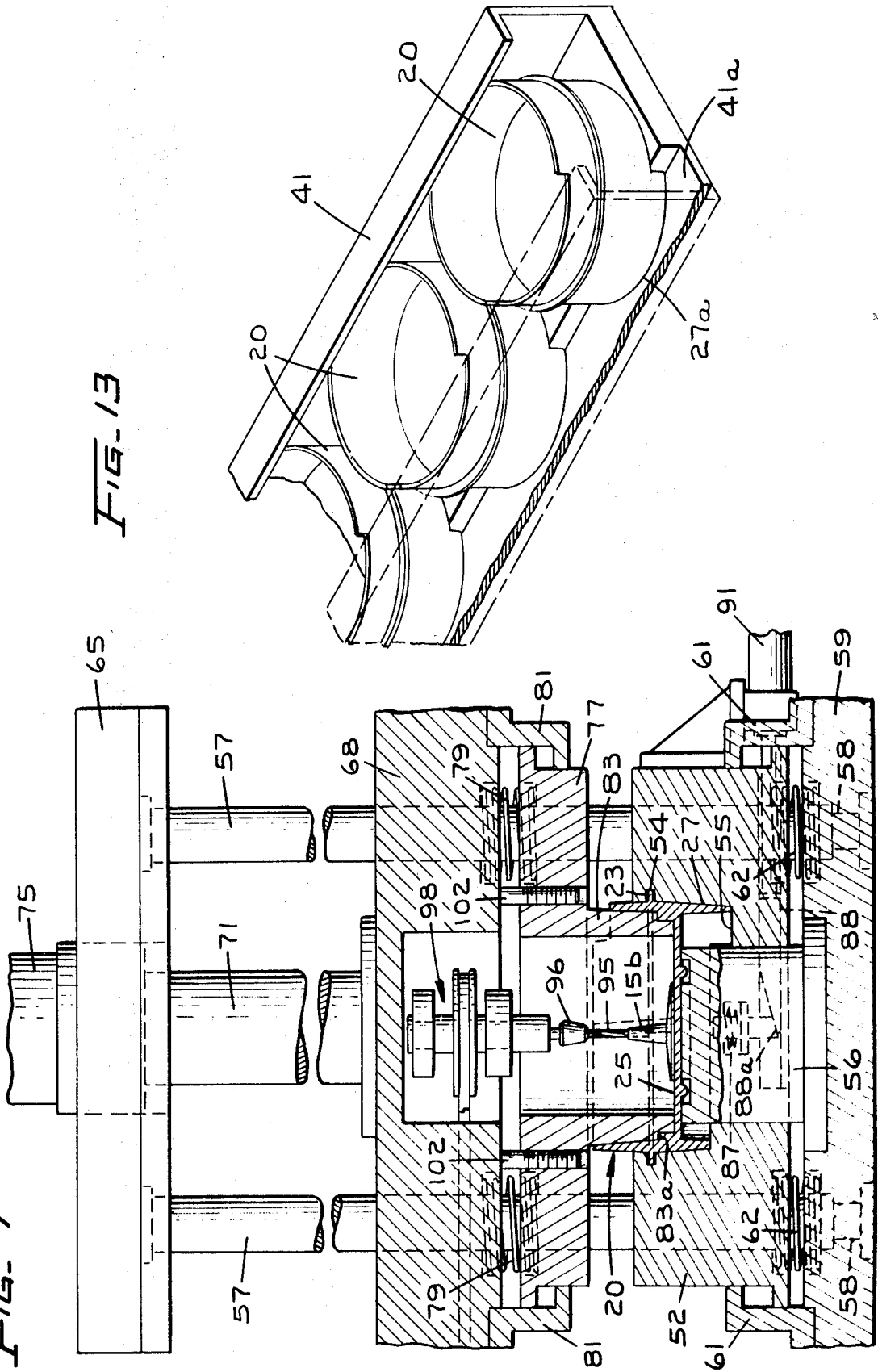

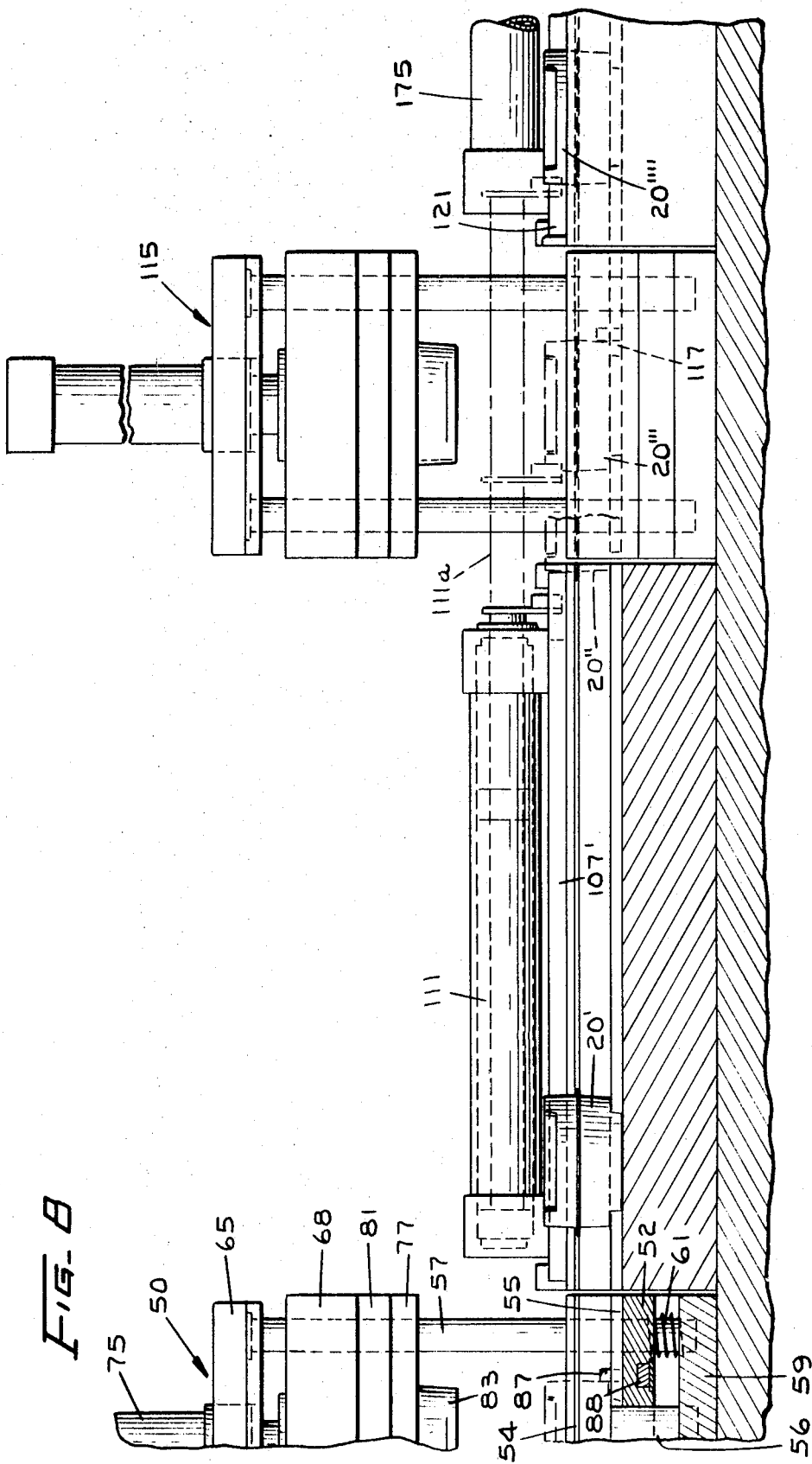

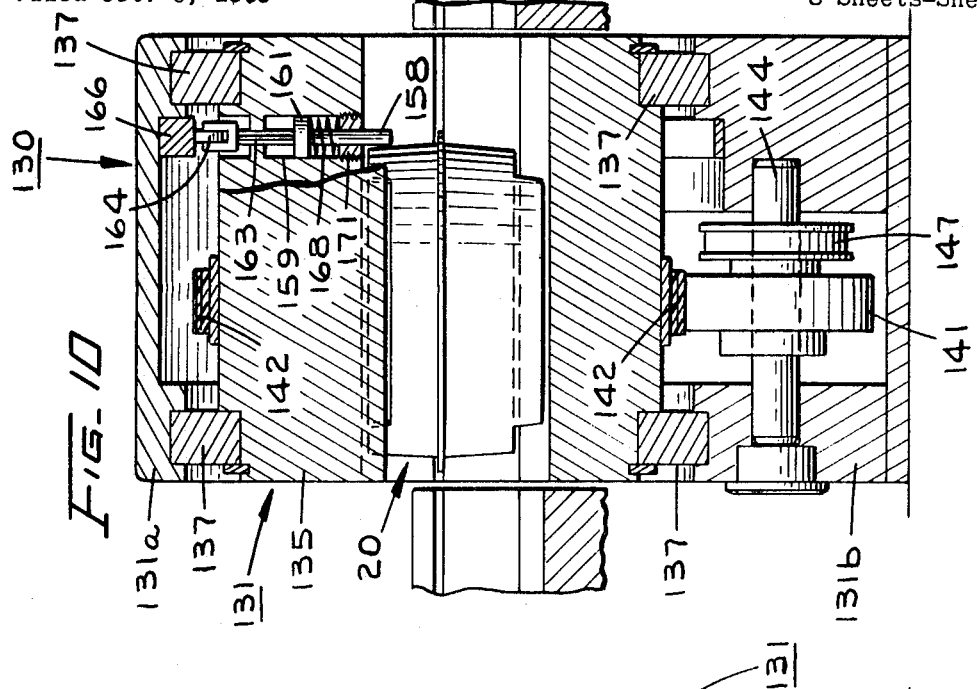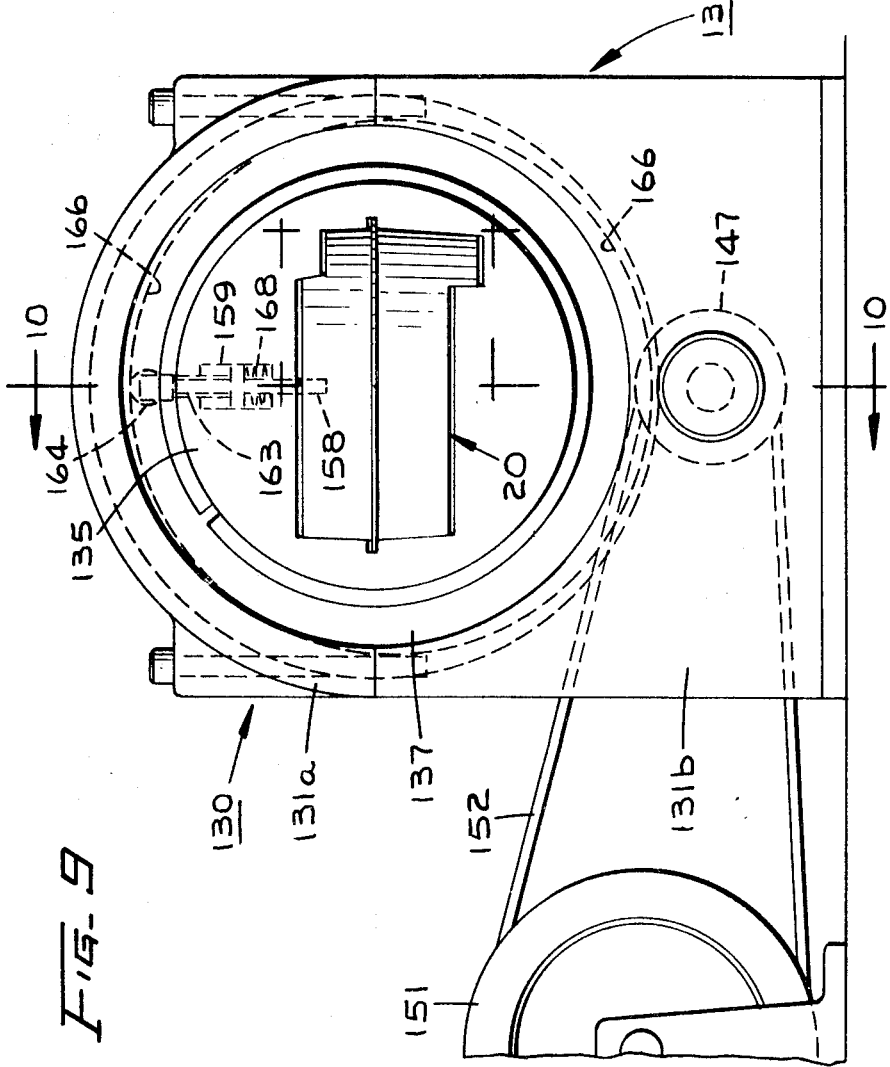

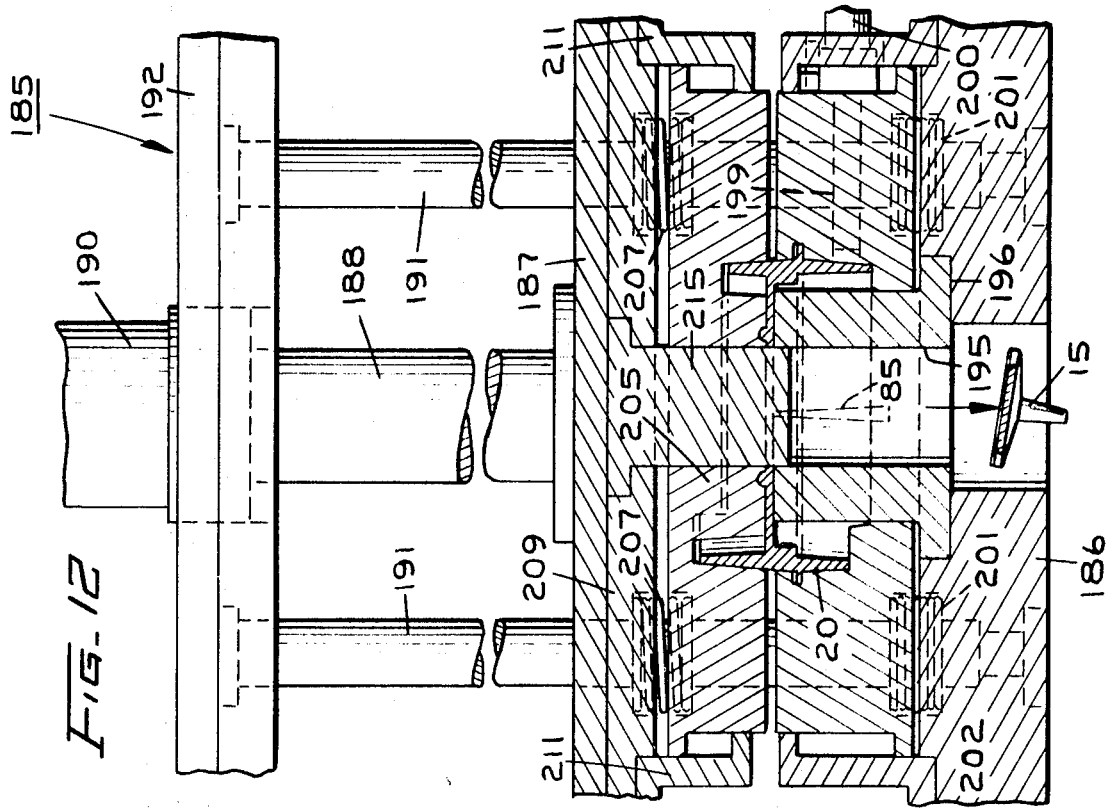
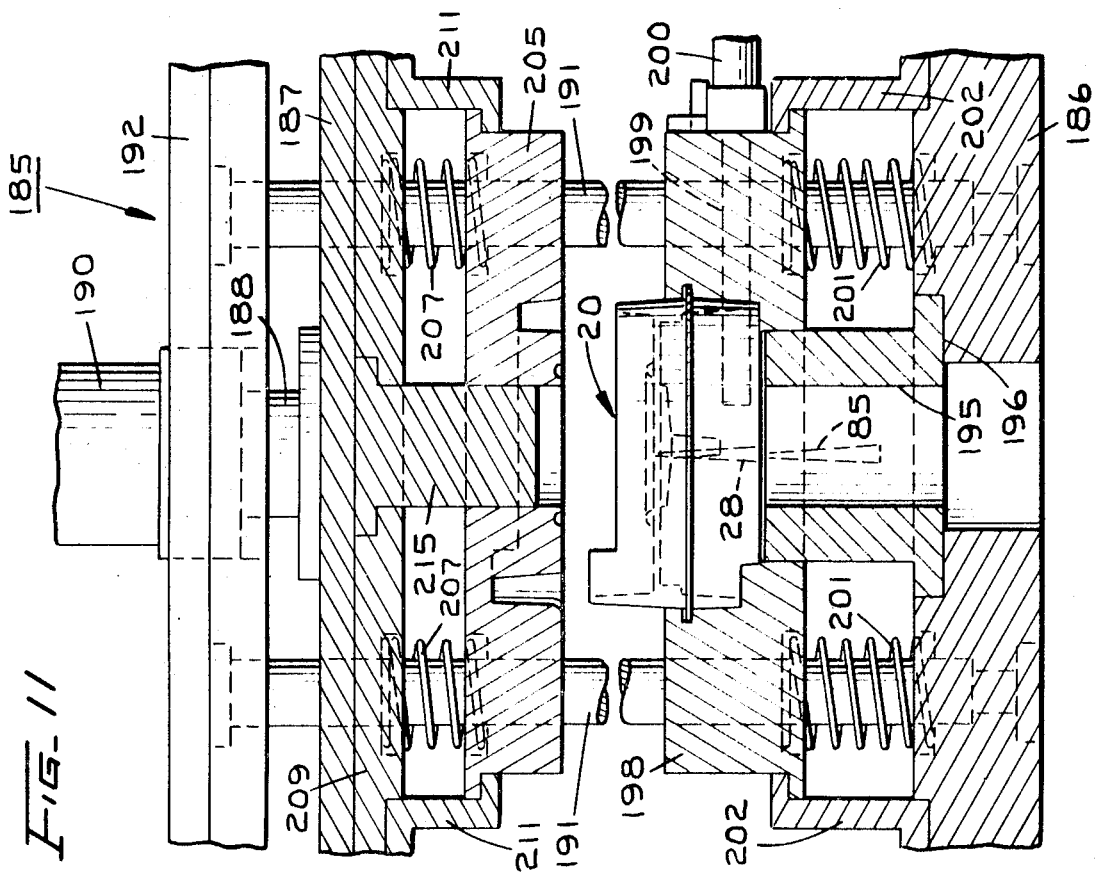

3,613,219
METHOD OF MANUFACTURING PIECE PARTS
Everett H. Fisher, Wilkinson, Ind., assignor to Western Electric Company, Incorporated, New York, N.Y.
Filed Oct. 8, 1969, Ser. No. 864,652
Int. Cl. B23p 17/00
U.S. Cl. 29—423      8 Claims

ABSTRACT OF THE DISCLOSURE

A universal die cast or molded ring is formed with a flat outer rim of appreciable width and an integral inner web extending across the rim other than in a central region thereof. One or more parts, which may have irregular profiles and/or complex contours, are initially integrally formed with, and located within the central region of, the web. In accordance with the method, the rings, including the parts supported thereby, are successively fed, preferably from a vibratory supply bowl, to and properly oriented at one or more work stations whereat various machining operations are to be performed on the parts. Thereafter, each part is trimmed from the thin web of the associated ring and the latter is then fed along a vibratory track back to reclamation apparatus, whereat the ring is re-melted when formed of metallic die cast material or reground when formed of plastic material for subsequent use in forming a new ring-piece part combination.

BACKGROUND OF THE INVENTION

(1) Field of the invention

This invention relates to the manufacture of cavity-formed parts, both of the type die cast out of metal and of the type molded out of plastic materials, and particularly, with respect to a method of and a universal transport vehicle for temporarily supporting, feeding and orienting parts having irregular profiles and/or complex contours in an automated manner.

In the interest of simplicity, the word "mold" as used hereinafter is intended to encompass both metallic die casting and plastic molding apparatus, and the words "cavity-formed parts" are intended to denote either metallic die cast or plastic molded parts.

(2) Description of the prior art

In the cavity-forming art heretofore, parts having irregular profiles and/or complex contours, and which parts normally require a number of machining operations to be performed thereon, have generally been cavity-formed individually and then hand manipulated at the various work stations. In order to facilitate positioning, lugs, slots or ribs have often been formed in the parts.

Less frequently, and particularly with respect to asymmetrically shaped parts, a plurality thereof have been formed as an integral array, in one or more rows, by means of a common sprue and runner system. While this technique facilitates accurate positioning and alignment of the parts at a given work station, such an array of parts necessitates considerable physical handling, not only during the positioning thereof in a suitable fixture at each work station, but more often than not also with respect to transporting the arrays from the mold to each successive work station.

Further, and with particular reference to die cast parts, if the profile of a given part is irregular, it can become almost prohibitive from a cost standpoint to build precision dies that will cleanly trim the cast parts not only with respect to the gate associated therewith, but around the entire periphery of the part in the area defined by the parting line of the dies.

SUMMARY OF THE INVENTION

An object of the present invention is to provide a new and improved method of and a universal cavity-formed transport vehicle for temporarily supporting, feeding and orienting parts having irregular profiles and/or complex contours.

It is another object of this invention to provide a new, universal cavity-formed transport vehicle is constructed to temporarily and integrally support within a central region thereof one or more piece parts, with the vehicle having an outer surface configuration which facilitates automated feeding and having details formed therein which facilitates accurate positioning and orienting of the vehicle and part supported therewithin at one or more work stations.

In accordance with one method and structural embodiment of the invention, parts, which may have irregular profiles and/or complex surface contours, are formed as an integral part of a universal cavity-formed ring. The ring is formed with a flat, outer rim of appreciable width, a circumferential ridge projecting radially outwardly from the outer surface of the rim, and a circumferential web 25 which extends radially inwardly form the rim. The ridge not only facilitates the construction of more rugged and durable tooling associated with one particular type of cast and trim apparatus discussed in greater detail hereinafter, but the combination of the ridge and several notches located along the peripheral edges of the rim facilitates the feeding and orienting of the ring and part supported therewithin.

The subject method, applicable to either molding or die casting, but described with particular reference at this point to a die casting operation, comprises the steps of die casting a piece part within a central area of the web of the simultaneously die cast universal ring. The ring, including the part supported thereby, is then fed to and properly oriented at one or more work stations whereat various machining operations may be performed on the part. Thereafter, the part is trimmed from the ring, and the ring alone is fed, preferably along a vibratory track, back to a furnace whereat the ring is re-melted for subsequent recasting as a new ring-piece part combination.

BRIEF DESCRIPTION OF THE DRAWINGS

FIG. 6 is a side elevational view taken along the line 6—6 of FIG. 5, illustrating by way of example one particular type of drilling apparatus which may be employed at the first work station for providing a bore in the upwardly extending cylindrical shank portion of the finished part depicted in FIG. 4;

FIG. 7 is a sectional view taken along the line 7—7 in FIG. 5, of the drilling apparatus employed at the first work station;

FIG. 8 is a sectional view of a major portion of the composite work station apparatus taken along the line 8—8 of FIG. 5;

FIG. 9 is a side elevational view taken along the line 9—9 of FIG. 5, illustrating by way of example one particular type of apparatus which may be employed for rotating the transport ring, and part supported thereby, 180° after all of the machining operations have been performed on the part;

FIG. 10 is a sectional view taken along the line 10—10 of the transport ring-part rotating apparatus depicted in FIG. 9;

FIG. 11 is a sectional view taken along the line 11—11 of FIG. 5, illustrating by way of example one particular type of apparatus which may be employed at the third illustrative work station for trimming the completed part from the integral web of the transport ring, with the movable portions of the apparatus being shown in an open position;

FIG. 12 is a sectional view of the apparatus depicted in FIG. 11 illustrating the relative positions of the various movable portions thereof immediately after the part has been trimmed from the transport ring, and FIG. 13 is an enlarged perspective view of a portion of the guide track employed to feed and angularly orient the transport rings, a part of the guide track being shown in phantom so as to reveal how it accommodates several transport rings positioned therewithin.

DETAILED DESCRIPTION

Figure 3:
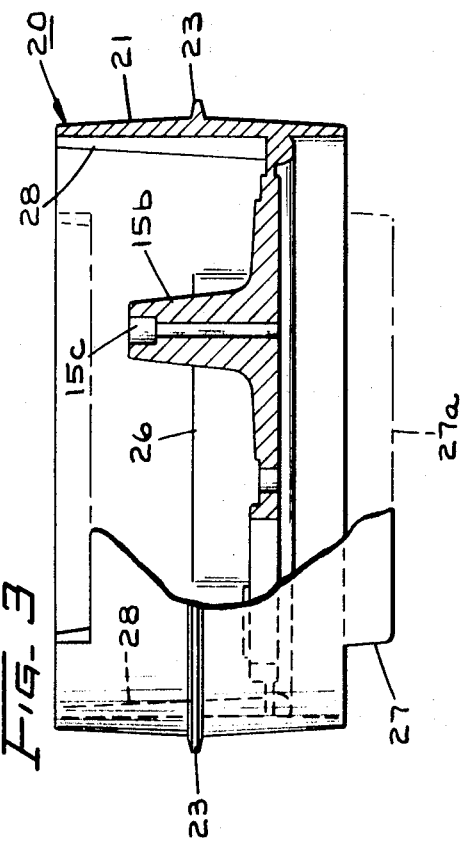
FIG. 3 is an enlarged view of the transport ring, with a substantial portion thereof being broken away so as to reveal in cross section and in greater detail the piece part integrally formed with the web of the ring.
Figure 2:
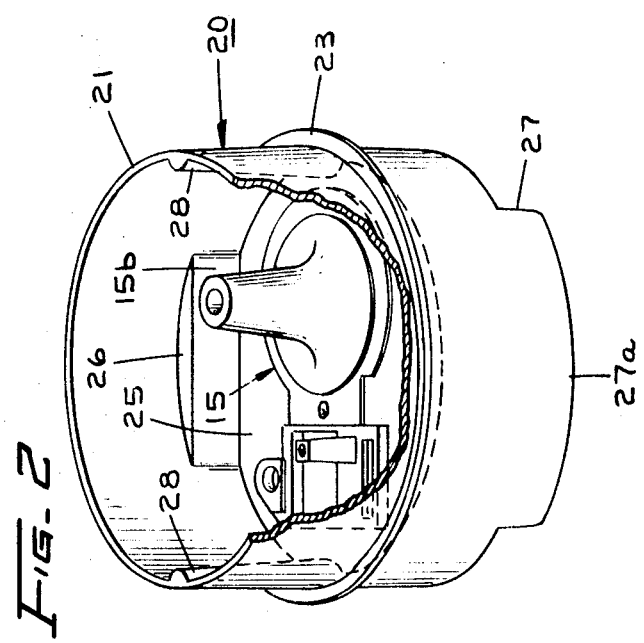
FIG. 2 is a perspective view of the cavity-formed transport ring with a portion thereof being broken away so as to disclose a typical part integrally formed within a central region of a web of the ring, as embodied in the invention.

In accordance with the principles of the present invention, and with particular reference first to FIGS. 2 and 3, a piece part having an irregular profile and a complex surface contour representing, by way of example, a ringer assembly 15 for a particular telephone set, is initially formed as an integral portion of and located within an inner area of a universal transport ring 20, best seen in FIG. 2.

As readily can be seen from an examination of the ringer assembly 15, it not only has an asymmetrical configuration, but has a number of openings 15a and projecting stud portions 15b with bores 15c formed therein. The complexity of such parts obviously makes difficult, if not impossible, not only the automated feeding of the part to and the accurate positioning and orienting of it at one or more work stations, but also the performing of machining operations thereon, without resort to a method and apparatus of the type embodied in the present invention.

With particular reference to FIGS. 2 and 3, the universal transport ring may be either molded or die cast out of any suitable thermoplastic material or castable metal, respectively. The transport ring 20 is formed with a flat outer rim 21 of appreciable width, with an integral circumferentially disposed ridge 23 projecting radially outwardly from a central region of the outer surface of the rim. An integral, circumferential web 25 extends radially inwardly from an intermediate region of the inner surface of the rim. The cavity-formed part or parts to be temporarily supported by the ring, such as the part 15, is initially formed as an integral portion, and located in the central region, of the web. For reasons discussed in greater detail hereinafter, the transport ring is also preferably formed with at least two mutually disposed and tapered wedges 26 and two mutually disposed and tapered ribs 28, the two sets being shown by way of example only in space quadrature.

The combination of the ridge 23 and one or more notches 27 located along at least one, but preferably asymmetrically along both edges of the rim, facilitates the feeding (from a vibratory supply bowl) to and the positioning and orienting of the parts supported within the ring at one or more work stations prior to the part being finally trimmed from the web of the ring. The use of asymmetrical notches on opposite peripheral edges of the ring, of course, facilitates automated sensing of whether the ring is initially positioned right side up or not prior to being fed to the various work stations. Thereafter, in accordance with the method of the invention described in greater detail hereinbelow, the ring is fed, preferably along a vibratory track, back to reclamation apparatus, whereat the ring is either re-melted in a suitable furnace when formed of metallic die cast material or re-ground in a suitable grinder when formed of plastic material for subsequent recasting or re-molding, respectively, as a new ring-piece part combination.

Figure 1:
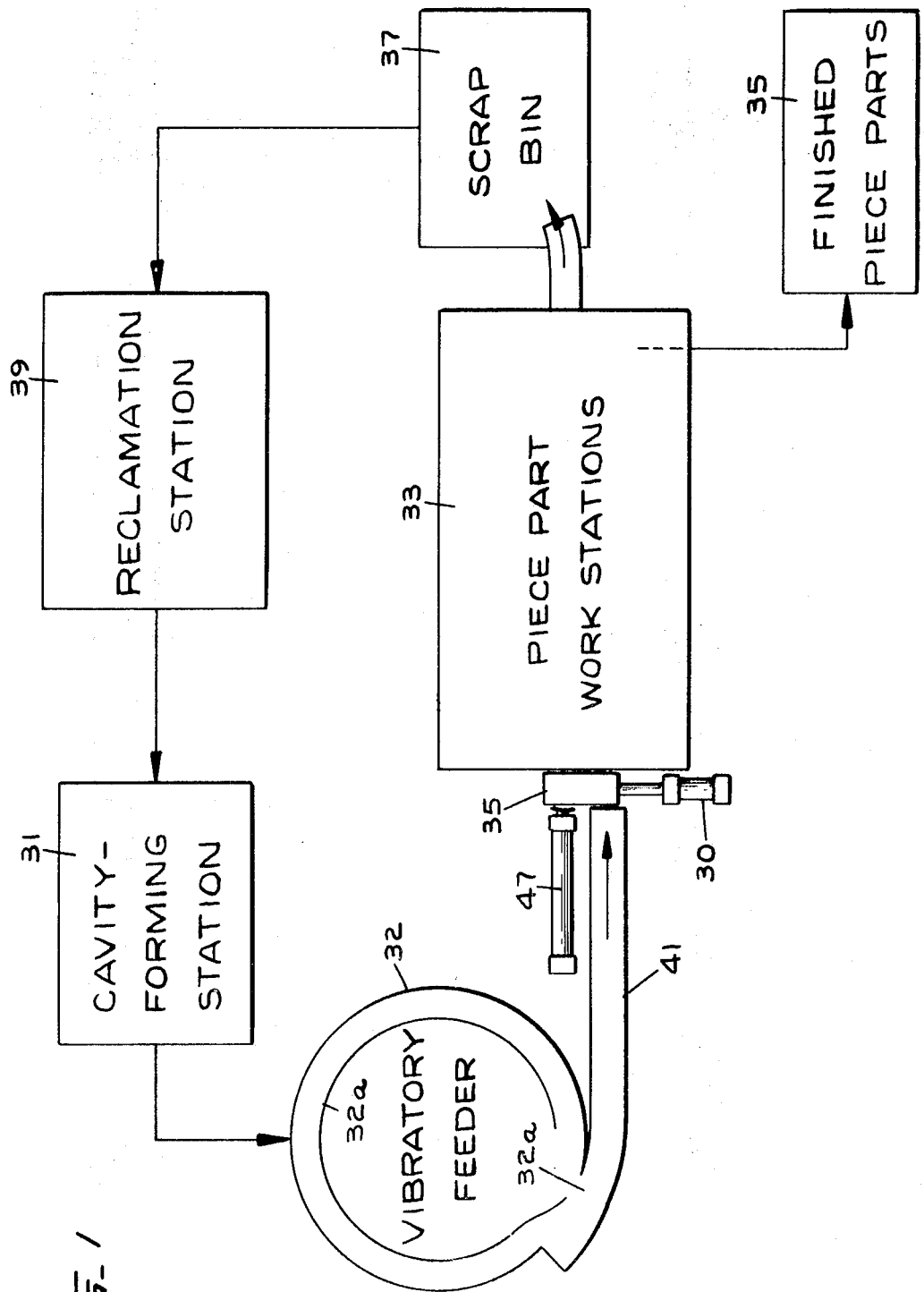
FIG. 1 is a flow type block diagram common to and representative of the basic mechanical units employed in combination to form parts, and thereafter, to feed them to and position and orient them at one or more work stations through the utilization of simultaneously formed and integrally associated universal transport rings, prior to the part or parts being trimmed from each associated ring as a final product in accordance with the principles of the present invention.
Figure 4:
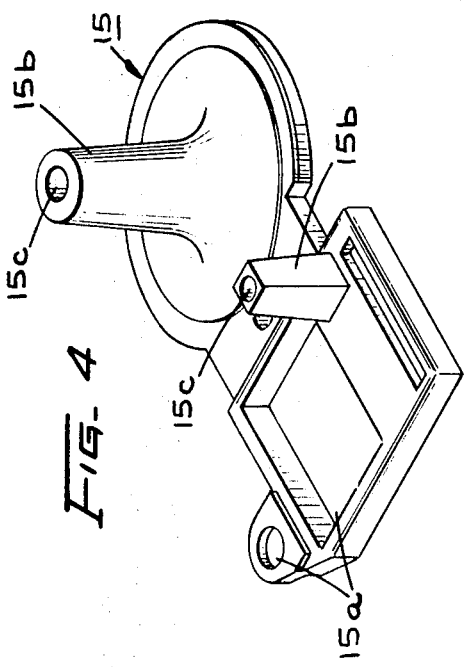
FIG. 4 is a perspective view of a completed part after having been machine worked and trimmed from the transport ring in accordance with the principles of the present invention.

In accordance with the method of the present invention, and with particular reference at this point to the block diagram of FIG. 1, the ringer assembly 15 depicted in FIG. 4 is initially cavity-formed simultaneously with the transport ring 20 as an integral combination at the station designated by reference numeral 31. Thereafter, the transport ring-part combination is preferably fed to a vibratory feeder and orientation supply bowl 32 where it may be temporarily stored until being fed therefrom to one or more work stations designated by numeral 33. At the work stations various machining operations may be performed on the part, such as bores or tapped holes formed in the projecting stud portions of the ringer assembly or apertures formed therein as depicted in FIG. 4. After all of the machining operations have been performed on the part, the final work station comprises a trim station whereat the completely formed part 15 is trimmed from the web 25 of the transport ring. Thereafter, the finished part is ejected into a suitable receptacle designated by the block 35 and the transport ring minus the part is ejected into a scrap bin 37 or directly fed to reclamation apparatus 39.

As the cavity-forming apparatus designated by the block 31 may advantageously employ the features of the molding apparatus disclosed in my copending application, Ser. No. 790,010, filed Jan. 9, 1969, titled "Methods of and Cavity Injection Type Apparatus for Forming Articles," only a brief description with respect to that operation will be described hereinafter. The reclamation apparatus designated by the block 39 may comprise any one of a number of conventional and commercially available melting furnaces or grinders, the particular type being primarily dependent on whether or not the application is to be employed in the manufacture of die cast or plastic molded parts. Similarly, the vibratory supply bowl 32 may be of conventional construction, with the size thereof being dependent primarily on the size of the transport ring. The size of the ring, of course, is primarily dependent on the number and size of the parts to be temporarily supported therewithin. As the block diagrams designated 35 and 37 relating to the receptacles for the finished piece parts and scrap, respectively, may also comprise any conventional type of container of rudimentary construction, no particular details thereof will likewise be illustrated hereinafter.

Considering now in greater detail the apparatus represented by the blocks 31 and 33 of the diagram depicted in FIG. 1, the cavity-forming station apparatus may advantageously comprise a mold of the type disclosed in my aforementioned copending application wherein the gate of the formed composite transport ring and part is automatically severed, the periphery of the ring trimmed of any flash, and any perforating operations performed on the part prior to the opening of the cavity. These operations are performed by effecting simultaneous movement, in unison, of the cavity-defining core members (with the composite ring and part confined therebetween) across the parting line of the mold prior to effecting relative movement between the core members to open the mold. Advantageously, all of these operations, depending in part on the type of material used, and on the operating pressures and temperatures employed, may take place while the material is still in a semi-solidified state which, of course, greatly reduces the wear of the core members involved in producing the operations in question.

After the transport ring 20 and the part 15 have been simultaneously formed as an integral unit, it is fed, preferably along a conventional vibratory track or power driven conveyor to the vibratory feeding and orientation supply bowl 32, schematically illustrated in FIG. 1. Other than normally being larger in size than most vibratory bowls, the vibratory bowl is conventional in design and comprises the normal helical feed track affixed to the outer wall of the bowl so as to feed the transport rings serially to the first work station area designated generally by the reference numeral 33 in FIG. 1. In addition to feeding the transport rings, the helical guide track 32a of the vibratory bowl is constructed to also orient the rings relative to the axis thereof, and to insure that the rings are fed into the outgoing track leading to the first work station right side up. One typical supply bowl constructed for the subject application was purchased from the Vibromatic Co., of Noblesville, Ind.

By way of illustration only, the work station apparatus generally identified by the block 33 in FIG. 1 may, for one particular application of performing a number of machining operations on the ringer assembly 15 depicted in FIG. 4, take the form depicted in greater detail in FIGS. 5–13.

Figure 5:
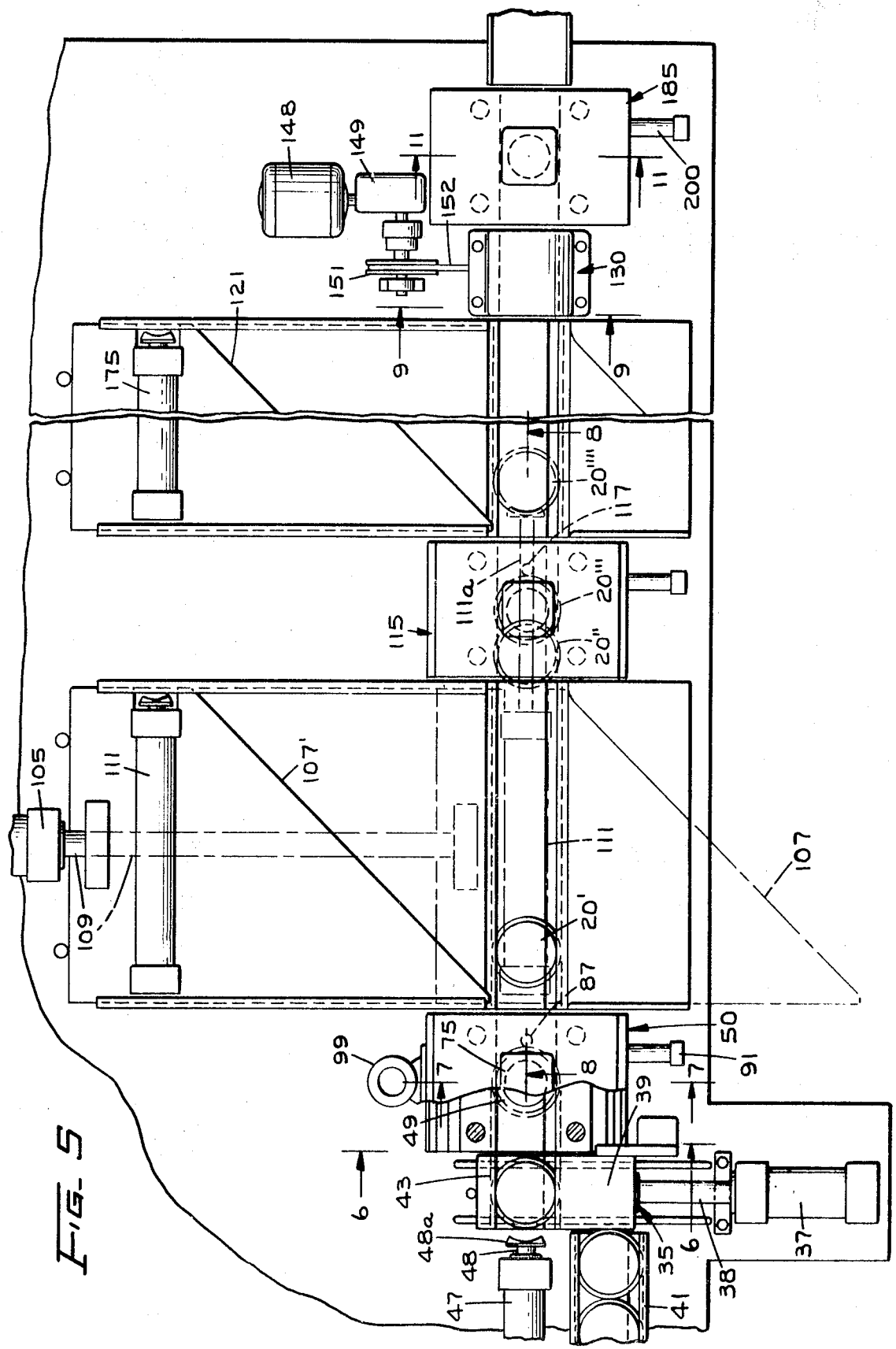
FIG. 5 is a plan view, partially broken away in the vicinity of the first operating station, illustrating one typical embodiment of the overall apparatus encompassed in the box designated work station in FIG. 1.

Considering FIG. 5 first in greater detail, a plurality of transport rings 20 with partially completed piece parts 15 respectively supported within the integral webs 25 thereof are successively fed into a cross slide mechanism 35 whereat a reciprocal, pneumatically operated air cylinder 37, through a piston 38 connected to a head 39, drives a composite transport ring-part 20 from a position aligned with a feed track 41 to a position aligned with a work station feed track 43. From the latter position, a reciprocally operated pneumatic cylinder 47, through a piston 48 and head 48a, advances the composite transport ring-part to and positions it in a nest 49 associated with the first work station designated generally by the reference numeral 50. The construction of the feed tracks and the manner in which they properly orient the transport rings are best seen in FIG. 13. As depicted in that figure, which illustrates a portion of the guide track 41 by way of example only, it is seen that the lower portion of the guide track is formed with a groove 41a which accommodates the projection 27a formed in the bottom peripheral edge of the transport ring 20 (see FIG. 2). This construction insures that the guide tracks maintain the transport rings in the desired angular position while being fed therealong.

With particular reference now to FIGS. 6–8, when the pneumatic cylinder 47 drives a transport ring 20 into the nest 49 of the first work station 50, the ring is initially supported by a spring-biased platform 52 (see FIGS. 6 and 7), which has a recessed track-forming portion 53 which accommodates the lower half of the transport ring. Platform 52 preferably also has an undercut groove 54 formed therein which accommodates the outwardly projecting ridge 23 of the transport ring, and a recessed portion or groove 55 which accommodates the downwardly projecting shoulder 27a of the ring, best seen in FIGS. 2 and 3.

Associated with the spring-biased platform 52 at the first work station is a cylindrical stationary platform 56 forming a temporary portion of the guide track. The latter is centered beneath the transport ring, with the upper planar portion thereof normally being spaced a short distance from the adjacent under surface area of the web 25 of the transport ring. As will become more apparent hereinafter, this spacing allows the spring-biased platform 52 forming a portion of the guide track to be biased downwardly so that the stationary platform 56 will firmly abut against the underside of the web during the final aligning and clamping of the transport ring at the work station.

The platform 52 has a plurality of bores extending therethrough, four in the illustrated embodiment, which respectively accommodate different guide rods 57, only two being seen in FIGS. 6 and 7. The guide rods are secured at their lower ends within aligned recesses 58 of a support base 59. Separate coil springs 62 are positioned coaxially about the guide rods 57, with the top and bottom ends of each spring being seated within aligned recesses formed in the platform 52 and support base 59, respectively. Two mutually disposed Z-shaped brackets 61, secured at their lower ends within recesses of the stationary base 59, have upper inwardly extending leg portions which function as stops to limit the normal spring-biased displacement of the platform 52 from the base 59.

The upper ends of the guide rods 57 are secured by any suitable means to a stationary support plate 65. A movable pressure plate 68, which may comprise the movable platen of a press, for example, is formed with a plurality of bores therein which are aligned with and respectively accommodate the guide rods 57 in slidable relationship therewith. As illustrated, a piston 71 of a reciprocally operated pneumatic air cylinder 75, for example, is connected to and effects the reciprocal movement of the pressure plate 68 along the guide rods. A spring-biased clamping plate 77 also has four bores formed therein which are respectively aligned with and slidably accommodate the guide rods 57. A different coil spring 79 is coaxially positioned about each guide rod 57, and normally spring biases the clamping plate 77 in spaced relationship relative to the movable pressure plate 68.

For reasons that will become more apparent hereinafter, the coil springs 79 are constructed to be stiffer than the coil springs 62. Two mutually disposed Z-shaped brackets 81, secured at their upper ends to the movable pressure plate 68, have lower inwardly extending leg portions which function as stops to limit the spring-biased displacement which normally exists between the movable pressure plates 68 and the clamping plate 77.

Forming a portion of the clamping plate 77 is a cylindrical core-shaped portion 83 which is dimensioned to closely fit within the top half of the transport ring. The core portion is provided with mutually disposed, tapered undercut edges 83a which bias against the adjacent tapered wedges 26 initially formed in the transport ring, as best seen in FIGS. 2 and 3. Also to insure accurate and tight clamping of the transport ring at the work stations, the core-shaped portion 83 of the clamping plate 77 is also preferably formed with at least two axially extending and tapered grooves 85 which are respectively aligned with and bias against the ribs 28 which extend inwardly and form an integral part of the wall of the transport ring, as best seen in FIG. 2.

In order to insure that each successive transport ring 20 is moved to a precise location at each work station, such as station 50 (by means of the actuation of the air cylinder 39, FIG. 5), a spring-biased stop pin 87 is moved upwardly at the appropriate time so as to project above the stationary platform 56 and abut against the front, lower half of the transport ring in the direction of travel (see FIG. 6). This spring-biased pin 87 is actuated to move up and down by means of a reciprocally operated cam 88 which has a tapered surface 88a formed along a terminating end region thereof. The cam 88 may be reciprocally actuated at the appropriate times by any suitable means, such as the illustrated pneumatically operated cylinder 91.

By way of example only, the first work station 50 is illustrated as a drilling station and hence, as depicted in FIGS. 6 and 7, a drill 95 is mounted in a drilling head 96, which in turn is rotatably secured to the movable pressure plate 68. Power is supplied to the drill through a shaft-pulley-belt drive unit, designated generally by the reference numeral 98, coupled to an electric motor 99. The motor is secured by a suitable support bracket 101 to the pressure plate 68.

Whereas FIG. 6 illustrates the various structural elements employed at the work station 50 in their normally open and unoperated positions, FIG. 7 illustrates the same work station apparatus after the transport ring has been accurately aligned and clamped between the spring-biased clamping plate 77 and the combination of the spring-biased platform 52 and the stationary platform 56, in preparation for the commencement of a drilling operation.

In order for the various movable work station members to acquire the relative positions depicted in FIG. 7, the core-shaped portion 83, integral with or otherwise secured to the clamping plate 77, initially is moved downwardly until it biases against the upper surface of the web 25 of the transport ring. Further movement causes the spring-biased platform 52 to move downwardly until the upper surface of the stationary platform 56 abuts against the under surface of the web 25.

At this point the drill 95, supported by the pressure plate 68, has not made contact with the piece part 15 supported within the web, as the stiffness of the springs 79 is greater than that exhibited by the springs 62. This allows the pressure plate 68 and clamping plate 77 to retain the separation depicted therebetween in FIG. 6. During this increment of downward travel of the pressure plate 68 and clamping plate 77, essentially in unison under the control of the piston 71 of the pneumatic cylinder 75, the tapered surfaces 83a and tapered grooves 85 formed in the core-shaped portion 83 of the clamping plate respectively bias against the wedges 26 and tapered ribs 28 of the transport ring (see FIG. 2). This insures accurate alignment and orientation of the part 15 supported by the transport ring prior to the commencement of a drilling operation.

After the core-shaped portion 83 of the clamping plate 77 has moved downwardly sufficiently to bias the web 25 of the transport ring against the stationary platform 56, the piston 71 continues to move the pressure plate 68 downwardly relative to the clamping plate 77 so that the drill 95 extends into the top portion of and bores a hole 15c in the upwardly protruding cylindrical shank portion 15b of the piece part, best seen in FIG. 4. In order to control the depth of the drilling operation, a pair of adjustment screws 102 are illustrated as being threadably secured within tapped holes of the clamping plate 77. These screws extend through the upper surface of the clamping plate by a distance which controls the spacing of the mutually disposed adjacent surfaces of the pressure plate 68 and clamping plate 77. The change in this spacing, as depicted between FIGS. 6 and 7, is determinative of the depth to which the drill extends into the protruding portion 101 of the piece part. It is to be understood, of course, that any one of a number of machining operations could be performed on the part illustrated, or on any other cavity-formed part, such as a perforating operation to form the apertures 15a (FIG. 4) in station fixturing of the type herein disclosed.

After the drilling operation, the air cylinder 75 moves the piston 71 upwardly, this causing the pressure plate 68 to move initially therewith relative to the clamping plate 77, with the latter thereafter also moving upwardly along the guide rods 57 to the position again depicted in FIG. 6. At this time the stop pin 87 is retracted downwardly by the actuation of the pneumatic cylinder 91, and the pneumatic cylinder 47 (FIG. 5) is then actuated so that the piston associated therewith extends outwardly to drive transport ring 20 from the central nesting location illustrated in FIG. 5 to the position designated by the reference numeral 20' in that figure. After the transport ring reaches this latter position, the piston of the air cylinder 47 is again retracted so as to await the alignment of the next succeeding transport ring fed to a position in alignment therewith by the actuation of the air cylinder 37, this operation having been described in detail hereinabove.

With the transport ring located at the position 20' in FIG. 5 a drive source, such as the pneumatically operated air cylinder 105, drives a triangularly shaped cross slide cam 107 horizontally, with the sloping edge 107' acting as a cam surface to in turn drive the transport ring located at 20' through an arbitrary distance which is dependent primarily on the physical spacing required between successive operating stations. With the piston 109 of the air cylinder 105 fully extended, the triangular cross slide member 107 is located at the position indicated in phantom in FIG. 5.

When in this position, another driving source, such as the pneumatically operated cylinder 111, which is secured to the cross slide member 107, is positioned in alignment with the guide track and is actuated to drive the transport ring from the position designated 20" to a central nesting position 20"' within a second work station designated generally by the reference numeral 115. Accurate positioning of the transport ring 20 at work station 115 is accomplished with a stop pin 117 which is constructed and operated in the same manner as the stop pin 87 described in connection with a discussion of the first work station 50.

A more detailed view of the pneumatic cylinder 111 and of the nest position of a transport ring 20 and stop pin 117 at the second work station is depicted in FIG. 8. In that figure, it can be seen that the cross slide 107 (FIG. 5) has not yet been operated to drive the transport ring located at 20' to the right (toward the second work station).

Work station 115 may be employed to perform any one of a number of machining operations on a part of the type embodied herein, as well as on any other part. By way of example, work station 115 is employed to drill a second bore 15c in the upper portion of the rectangularly shaped projection 15b, as best seen in FIGS. 2 and 4. One or more additional work staations may be employed to form the perforated areas 15a in the part 15. As the basic work station structure to accomplish the drilling and/or perforating operations are essentially identical to that illustrated and described in connection with FIGS. 6 and 7, no further description with respect to work station 115 is necessary in describing the principles involved in the present invention.

After the machining operations have been completed on the part at work station 115, the pneumatic cylinder 111 is again actuated so that the piston 111a thereof drives the transport ring and part retained therein from the central nesting region 20"' of work station 115 to a point along the guide track where the transport ring is designated by the reference numeral 20"" in FIGS. 5 and 8. Phantom lines illustrate the piston 111a in a fully extended position after having advanced a transport ring successively from the position 20" to the nest position 20"' and finally to the position 20"" whereat the piston is fully extended. At this point, another triangularly shaped cross slide member 121 (FIG. 5), which may be identical to the one designated 107, is driven by a pneumatic cylinder similar or identical to the one designated 105, but not illustrated in the broken view of cross slide member 121. Cross slide 121 when extended to a position similar to that shown in phantom for cross slide 107, causes the transport ring to move from the location at which it is designated 20"" to a position (not shown) whereat it has partially entered an orienting fixture designated generally by the reference numeral 130. Thereafter, a pneumatic cylinder 175 secured to the cross slide 121 drives the transport ring to a stop position within the orienting fixture 130 in the same manner as pneumatic cylinder 111 drives the rings to a stop position in the work station 115 described hereinabove. It is to be understood, of course that any number of diverse work stations and associated cross slides and driving sources of the type illustrated herein with respect to work stations 50 and 115 may be employed prior to the transport ring arriving at the orienting fixture.

The orienting fixture is constructed to rotate the transport ring and part confined therewithin 180° so as to be upside down, thereby facilitating the trimming of the part from the ring at a subsequent trimming station 185. The orienting fixture (best seen in FIGS. 9 and 10) comprises a two-piece stationary frame 131 with both the upper and lower portions 131a and 131b having mutually disposed semi-circular grooves which rotatably accommodate a guide track ring 135 (best seen in FIG. 10). The guide track ring 135 is rotatably supported by means of roller bearings 137 which are confined within mutually disposed recesses formed in the guide track ring 135 and in the inner walls of the stationary portions 131a and b of the frame 131. Rotation is imparted to the guide track ring 135 by means of a drive wheel 141 (FIGS. 9 and 10) which frictionally engages a cylindrical resilient pad 142 secured to the outer wall of the guide track ring 135. The drive wheel is secured to a shaft 144 which is rotatably supported at its ends by any suitable bearing means positioned within recessed bores of the stationary portion 131b of the frame 131. Also affixed to the rotatable shaft 149 is a pulley 147. The driving source comprises a motor 148 (FIG. 5) which, through a gear reduction unit 149, drives a pulley 151. Pulley 151 in turn, through a belt 152, drives the pulley 147 and thereby the drive wheel 141 which is connected to the common shaft 144.

In order to accurately position the transport ring within the guide track ring 135, after having been advanced thereto by means of the triangularly shaped cross slide 121 and pneumatic cylinder 175 (illustrated in FIG. 5), a spring-biased stop pin 158 is mounted within a bore 159 in the guide track ring (as best seen in FIG. 10). Pin 158 has a head portion 161 which is in contact with a driving pin 163, the latter being connected to a rotatable cam follower 164. The latter is held in continuous rotatable contact with a circumferentially disposed and asymmetrical cam member 166 by means of the biasing force exerted by a coil spring 168. This spring is interposed between the head portion 161 of the stop pin and a threaded insert 171 positioned within a tapped portion of the bore 159. The contour of the asymmetrical cam member 166, which is secured to the upper and lower stationary portions 131a and b of the frame, is best seen from the dashed lines defining the contour thereof as illustrated in FIG. 9.

The purpose of the cam member 166 is to lower the stop pin 158 to properly position the transport ring after it has been inserted within the guide track ring 135, and to raise the stop pin after the transport ring has been rotated 180° so as to allow a drive source, such as the pneumatic cylinder 175 mounted on the triangularly shaped cross slide 121 (FIG. 5), to thereafter drive the transport ring into a trimming station 158 depicted generally in FIG. 5 and in detail in FIGS. 11 and 12.

The trimming station is comprised of structural elements very similar to those employed in the drilling work station 50 described in detail hereinabove. As such, the various elements illustrated in FIGS. 11 and 12 will only be described briefly herein. The basic structural elements comprise a stationary base plate 186 and a movable pressure plate 187, the latter being secured to a reciprocal driving source, such as a piston 188 connected to a pneumatically operated cylinder 190. A plurality (four in the illustrative embodiment) of guide rods 191 are respectively secured at their lower ends within bores in the base plate 186 and to an upper stationary plate 192. A cylindrical stationary platform 195 is secured at its lower end within undercut shoulders 196 formed in the stationary base plate 186. The upper annular surface of the stationary platform 195 is dimensioned to make contact with an outer peripheral area of the underside of the web 25 of the transport ring 20 after the latter has been properly positioned. As such, the part 15 is encompassed by the cylindrical wall of the stationary platform.

The transport ring upon initially being fed into the trimming station, by the piston of the actuated pneumatic cylinder 175, is supported upon a spring-biased, guide track-defining platform 198. A retractable pin 199, actuated by a pneumatic cylinder 200 provides a positive stop for the transport ring. The platform has a plurality of bores therethrough which are respectively aligned with and dimensioned to slidably accommodate the guide rods 191. The platform rests upon a plurality of coil springs 201 which are respectively positioned coaxially of the guide rods 191, and retained at their upper and lower ends, respectively, within recesses formed in the spring-biased platform 198 and the stationary base plate 186. Mounted as such, the platform 198 is normally maintained in spaced relationship relative to the stationary base plate 186 as depicted in FIG. 11. Two mutually disposed Z-shaped brackets 202, having their lower ends secured within suitable recesses of the stationary base plate 186, and the upper leg portions thereof extending inwardly, function as stops limiting the spring-biased displacement between the stationary base plate and the spring-biased platform 198.

An upper spring-biased clamping plate 205 also has a plurality of bores therethrough which are respectively aligned with and dimensioned to slidably accommodate the guide rods 191. A plurality of coil springs 207 are respectively positioned coaxially about the guide rods 191 and interposed between and within recesses of the clamping plate 205 and an auxiliary plate 209 secured to the pressure plate 187. Two mutually disposed Z-shaped brackets 211 secured at their upper ends to the auxiliary plate 209 function as stops for the clamping plate 205.

In operation, when the piston 188 of the pneumatic cylinder 190 is actuated to move downwardly, after a composite transport ring and part have been positioned at the proper location along the guide track of the spring-biased platform 198, the clamping plate 205 moves downwardly until it contacts the upper peripheral edge of the transport ring. At that point, and with the coil springs 207 being constructed to be stiffer than the coil springs 199, the clamping plate 205 in biasing downwardly against the transport ring forces the spring-biased platform 198 downwardly until the lower surface of the web 25 of the transport ring abuts against the upper mating surface of the stationary platform 195, as illustrated in FIG. 12. Thereafter, continued downward movement of the piston 188 causes compression of the coil springs 207 which, in turn, effects relative movement between the pressure plate 187 and the clamping plate 209. As a trimming core 215 is secured to the pressure plate 187, it also moves downwardly through the web 25 and thereby trims the part from the web 25 of the transport ring.

The distance which the pressure plate 187 moves downwardly relative to the clamping plate 205 is not particularly critical in the trimming operation, as distinguished from the drilling operation, because such downward movement need only be sufficient to result in the lower end of the trimming core 215 extending through the lower surface of the web 25 of the transport ring by a distance sufficient to cleanly sever the completely fabricated part 15 from the web, as depicted in FIG. 12.

After the finished part 15 has been trimmed from the transport ring, the ring is then fed, preferably along a vibratory track back to the reclamation apparatus 39, illustrated only in block diagram form in FIG. 1, for re-melting or re-grinding and subsequent use as raw material to be injected into the transport ring-part cavity forming apparatus 31. As previously mentioned, the cavity forming apparatus may be of the type disclosed in my aforementioned copending application, and may be constructed for use in either a die-casting or molding application.

In summary, it is seen that the guide track feeding, positioning and orienting structure disclosed in detail hereinabove, when utilized in combination with any one of a number of commercially available type of die casting or molding apparatus and metal scrap-melting furnaces or plastic grinding and extruding apparatus, provides a very unique and advantageous method, wherein parts having complex contours and/or irregular profiles may be readily formed initially as an integral part of a central web of a simultaneously cavity-formed universal ring, with the ring, including the part supported therewith, then fed to and positioned and oriented at one or more work stations whereat various machining operations may be performed on the part prior to it being trimmed from the web.

As the transport ring, minus the part, is then fed back to reclamation apparatus, there is no appreciable waste of raw material and a minimal chance of foreign materials entering the reclamation apparatus to contaminate the re-usable raw material. Moreover, when the present invention is utilized in conjunction with die casting or molding apparatus of the type disclosed in my aforementioned copending application, gate severing and trimming of the part along the parting line of the dies may be performed while the material is still in a semi-molten or plastic state, as an interconnected sprue and/or runner system is not necessary to transport the formed parts to and position them at one or more work stations, as has generally been required heretofore in the case of parts having complex shapes, and particularly when such parts necessitate precision machining after having been formed.

What is claimed is:

1. A method of manufacturing piece parts, including those having complex contours and irregular profiles, and which parts require one or more machining operations to be performed thereon after having been formed, comprising the steps of:

cavity-forming the part simultaneously with and as an integral portion of a cylindrical transport ring, said part being formed within a central area of a thin web which extends cross a cylindrical wall defining the rim of the ring;

feeding the ring with the partially completed part supported therewithin along a guide track to one or more work stations whereat one or more machining operations may be performed on the initially die formed but not completed part;

trimming the finished part from the web of the ring, and feeding the transport ring back to reclamation apparatus whereat the ring is reduced to raw material for subsequent re-use in forming a new transport ring-piece part combination.

2. A method in accordance with claim 1 whereat the transport ring is initially formed with a narrow circumferentially disposed ridge projecting outwardly from the outer surface of the rim of the transport ring, said ridge facilitating the forming of the ring initially and the positioning thereof in at least the sections of guide track associated with the work stations.

3. A method in accordance with claim 1 wherein said transport ring is initially formed with one or more notches along at least one peripheral edge of the rim thereof so as to facilitate the orienting and accurate positioning of both the transport ring and the part supported therewithin at the various work stations.

4. A method in accordance with claim 1 wherein the transport ring is formed with a narrow, circumferentially disposed ridge projecting outwardly from the outer surface of the rim of the transport ring, and with one or more notches being formed along at least one peripheral edge of the rim of the transport ring, the combination of the ridge and said one or more notches facilitating the feeding of and the orienting and positioning of the transport ring and part supported therewithin at one or more work stations.

5. A method manufacturing piece parts requiring one or more machining operations to be performed thereon after having been formed, comprising the steps of:

cavity-forming the part within a central web of a universal transport ring simultaneously cavity-formed with the part, then feeding the ring including the partially complete part supported therewithin to and orienting and accurately positioning both the ring and integral part at one or more work stations whereat various machining operations are to be performed on the part;

trimming the completely fabricated part from the integral web of the transport ring, and feeding the transport ring by itself to reclamation apparatus whereat it is reduced to raw material for subsequent use in cavity-forming a new ring-piece part combination.

6. A method in accordance with claim 5 wherein the transport ring-part combination is die cast out of a suitable re-meltable metal.

7. A method in accordance with claim 5 wherein the transport ring-part combination is molded out of a suitable thermoplastic material conducive to re-grinding for subsequent use in forming a new ring-part combination.

8. A method in accordance with claim 5 wherein the various machining operations are performed from one side of the partially completed part which is supported by the integral web of the transport ring, and further comprising the steps of:

orienting the transport ring upside down prior to the completely finished part being trimmed from the web.

References Cited
UNITED STATES PATENTS

| | | | |
|---|---|---|---|
| 2,156,692 | 5/1939 | Hixon | 29—418 X |
| 2,569,083 | 9/1951 | Wilhelm | 164—70 |
| 3,283,373 | 11/1966 | Kiefer et al. | 164—262 |
| 3,328,853 | 7/1967 | Pekrol | 164—262 |

JOHN F. CAMPBELL, Primary Examiner

V. A. DI PALMA, Assistant Examiner

U.S. Cl. X.R.

29—180, 183, 190, 418, 527.6, 558; 164—5, 70; 264—37, 162; 269—7, 287